United States Patent
Riester et al.

(10) Patent No.: US 8,376,901 B2
(45) Date of Patent: Feb. 19, 2013

(54) GEAR MECHANISM, PARTICULARLY PLANET GEAR WITH A FLANGE AND A RING GEAR

(75) Inventors: Thomas Riester, Willingen-Schwenningen (DE); Erkan Poyraz, Donaueschingen (DE)

(73) Assignee: IMS Gear GmbH, Donaueschingen (DE)

( * ) Notice: Subject to any disclaimer, the term of this patent is extended or adjusted under 35 U.S.C. 154(b) by 285 days.

(21) Appl. No.: 12/707,310

(22) Filed: Feb. 17, 2010

(65) Prior Publication Data

US 2010/0261572 A1    Oct. 14, 2010

(30) Foreign Application Priority Data

Apr. 14, 2009 (DE) .................. 10 2009 017 014

(51) Int. Cl.
*F16H 57/08* (2006.01)
(52) U.S. Cl. ........................................ 475/331
(58) Field of Classification Search ............ 475/331
See application file for complete search history.

(56) References Cited

U.S. PATENT DOCUMENTS

| | | | |
|---|---|---|---|
| 2009/0176615 A1* | 7/2009 | Gasparrini et al. | 475/331 |
| 2010/0056321 A1* | 3/2010 | Snyder et al. | 475/331 |

FOREIGN PATENT DOCUMENTS

| | | |
|---|---|---|
| DE | 1 130 237 B | 11/1962 |
| DE | 19738429 A1 | 9/1997 |
| DE | 19738429 | 3/1999 |
| DE | 10123548 | 12/2001 |
| DE | 10251499 A1 | 11/2002 |
| DE | 102006035228 | 2/2007 |
| WO | WO 03/050434 | 6/2003 |

OTHER PUBLICATIONS

Search Report for Parent DE 10 2009 017 014.6 (German 6 pages); and Translation of same in English (6 pages).
Duden: Deutsches Universalworterbuch. 3. auflage. Mannheim: Dudenverlag, 1996.S. 274, 1352, 1469 (German) ISBN 3-411-05503-0; German Dictoionary p. 274, 1352 and 1469.
Chinese Appln. Serial No. 201010128832.3 Office Action mailed Jun. 29, 2012, 5 pages—English, 6 pages—Chinese.

* cited by examiner

*Primary Examiner* — Edwin A Young
(74) *Attorney, Agent, or Firm* — Andrew F. Young, Esq.; Lackenbach Siegel, LLP

(57) ABSTRACT

A gear mechanism with at least a flange for the adaptation of the gear mechanism to a drive component and with at least one ring gear, which is firmly connected on the gear side to the flange. The flange presents at least a radial flange bore, the ring gear presents at least a radial ring gear bore, and a pin is led through a pair consisting of such a radial flange bore and such a radial ring gear bore, and in the process the flange and the ring gear are braced firmly against each other. The flange bore and the ring gear bore may be arranged with partial overlap in the axial direction and simultaneously partial mutual offset by an offset difference.

14 Claims, 4 Drawing Sheets

GEAR MECHANISM, PARTICULARLY PLANET GEAR WITH A FLANGE AND A RING GEAR

CROSS REFERENCE TO RELATED APPLICATIONS

This application claims priority from German Patent Application Serial No. 10 2009 017 014.6, filed Apr. 14, 2009, the entire contents of which is herein incorporated fully by reference.

FIGURE FOR PUBLICATION

FIG. 3.

BACKGROUND OF THE INVENTION

1. Field of the Invention

The present invention relates to a gear mechanism attached to a motor. More specifically, the present invention relates to a gear mechanism comprising a planet gear with a flange and ring gear which allows a reliable and clearance-free connection of the flange and adjacent ring gear.

2. Description of the Related Art

A planet gear usually comprises several planetary wheel carriers. The planetary wheel carriers are arranged with their central rotation axis on a rotation axis which extends in the axial direction from a motor pinion through the planet gear to an output side. The planetary wheel carriers present, with axis parallel to the rotation axis, several planetary wheel shafts, on which in each case a planetary wheel is attached. The dimensioning of the components is chosen here in such a way that the planetary wheels engage with their toothed ring in the motor pinion. In addition, the planetary wheels engage with their toothed rings radially on the outside in a ring gear toothed ring of a ring gear which surrounds the arrangement. One or more such ring gears are here designed as a gear housing, in accordance with a generally known design for planet gears. Usually, the planetary wheel carriers present, on the side facing the planetary wheels, a sun gear that extends along the axial direction, and in turn engages in the planetary wheels of a subsequent planetary wheel carrier. The last planetary wheel carrier of such an arrangement is firmly connected to an output shaft.

To connect such a planet gear with a gear component that is coupled to it, such as, a motor on one side, and additional gear components on the other side, a flange is arranged in the axial direction on both sides of the gear housing. In a design with fixed ring gear, the connection of the flange and of one or more ring gears can be achieved in a simple way by leading axis-parallel bores in their peripheral area through them, where, for the attachment, a screw or bolt is led through these axis-parallel bores.

An embodiment is also known in which the ring gears presenting the interior-side toothed ring is positioned with the flanges by means of a radial screw connection, and secured. Additional securing against unscrewing is provided in part by means of microencapsulated, coated screws. A clearance-free connection of the ring gears to the flanges is achieved also by means of a screw connection which is axis-parallel to the rotation axis. To prevent twisting between the ring gear and the flange, the latter are held additionally by means of a spline.

What is not appreciated by the prior art, however, is the need for an improved space-saving gear mechanism, particularly a planet gear, which allows nonetheless a reliable and clearance-free connection of the flange and an adjacent ring gear. In particular, the noise behavior of the planet gear is to be improved.

ASPECTS AND SUMMARY OF THE INVENTION

An aspect of the present invention is to provide a space-saving gear mechanism, particularly a planet gear, which allows nonetheless a reliable and clearance-free connection of the flange and an adjacent ring gear. In particular, the noise behavior of the planet gear is to be improved.

It is preferred, accordingly, to use a planet gear having at least one flange for the adaptation of the planet gear to a drive component and with at least one ring gear which is firmly connected on the planet gear side with the flange, where the flange presents at least one radial flange bore, the ring gear presents at least one radial ring gear bore, and a pin is led through a pair consisting of one such radial flange bore and one such radial ring gear bore, and, in the process, the flange and the ring gear are braced firmly against each other.

The flange presents particularly a flange projection or, which is to say the same, a peripheral narrowing, extending on the planet gear side in the axis-parallel direction, where the at least one flange bore is led through or into the flange projection.

It is preferred for the ring gear to present an axis-parallel ring gear projection which extends at least partially in the axis-parallel direction over the flange or the flange projection, where the ring gear bores leads through the ring gear projection.

It is preferred for the flange to present a flange abutment that is at a separation from the flange bore, for the ring gear projection to be clamped against the flange abutment, and for the flange abutment to be at a smaller separation from the flange bore than the ring gear bore is from the flange abutment.

In particular, the flange projection and the ring gear projection present mutually facing reference surfaces which are pressed with their surfaces against each other due to the clamped-in pin, or mutually braced. By means of such a design, the ring gear is pressed, as the pin is pushed in, into the bores in the radial direction with its surface against the flange abutment, which results in the ring gear and the flange being braced firmly against each other in the radial direction.

It is preferred for the pair, consisting of such a flange bore and such a ring gear bore, to be arranged with at least partial overlap in the axial direction and at the same time partial mutual offset by an offset difference. As a result of such a design, the ring gear or the ring gear projection is pressed, as the pin is pressed in, into the bore against the flange abutment, and thus braced firmly in the axial direction with the flange.

The pair consisting of such a flange bore and such a ring gear bore can be arranged with at least partial overlap in the axial direction, where the flange bore presents a broader opening width than the ring gear bore.

In particular, the pin is pressed by press fit into the flange bore and the ring gear bore.

It is preferred for such a planet gear to be used in each case four or more pairs consisting of such a flange bore and such a ring gear bore, into each of which such a pin is introduced.

A planet gear is thus improved, on the one hand, by an axial and radial securing or connection of a ring gear with an inner-side toothed ring, and, on the other hand, with flanges provided on both sides on the planet gear or on its external ring gears. As a result of this connection, no radial deformation of the cylindrical gear housing occurs, particularly of the ring gear with the toothed ring, and therefore no other corresponding lack of sphericity occurs. This has a positive effect on the noise behavior of the planet gear.

The clearance-free positioning of the toothed rings or ring gears with the flanges occurs here particularly due to the offset arrangement of the bores. As the pins are pushed into the offset bores, the flanges are held or pressed against a defined reference surface. Due to this offset arrangement of the bores, the flanges are held against the defined reference surface.

As a result, a securing of the connection is achieved, particularly by means of one or more cylinder pins, which are held by press fit in the ring gear or toothed ring, and in the flanges. As a result of this securing, the radial forces on the toothed ring of the ring gear are very low, and no deformation occurs, so that the rotation is improved. Accordingly, no deformations occur, which could have a negative effect on the noise behavior.

The above, and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
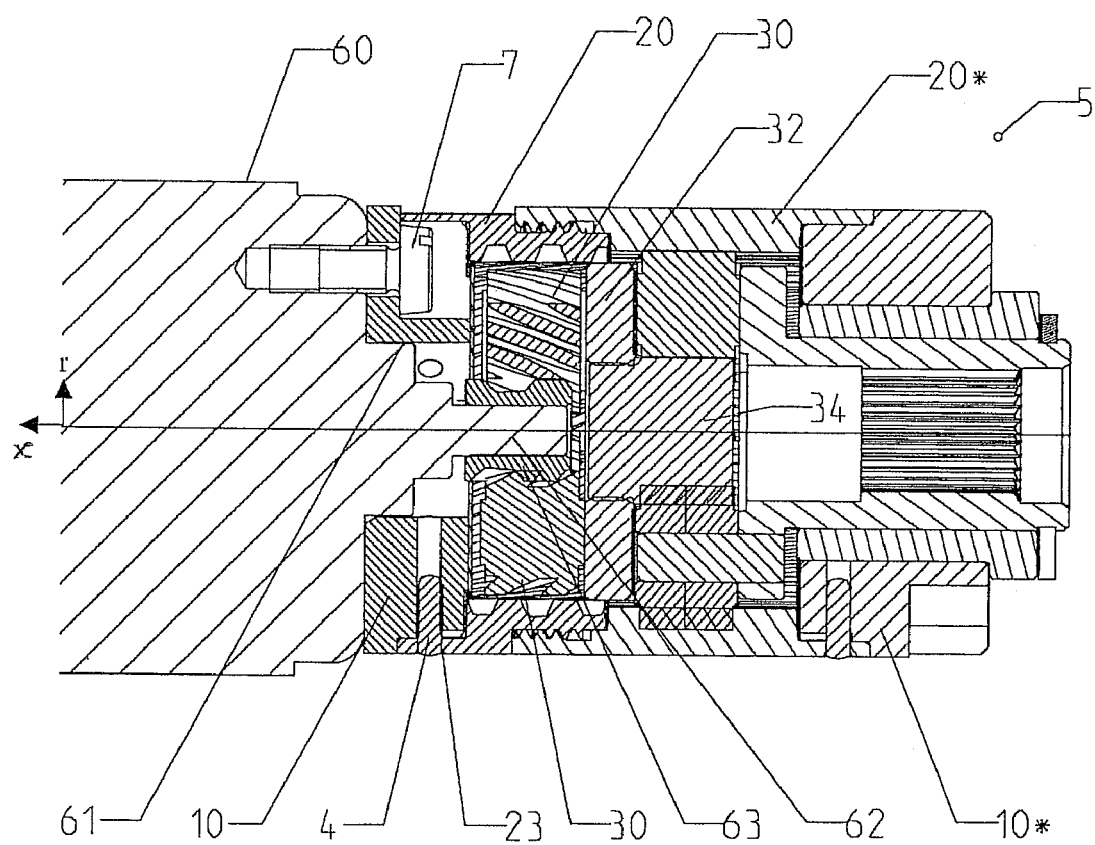
FIG. 1 is a cross-sectional view of the detail of a planet gear.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Figure 2:
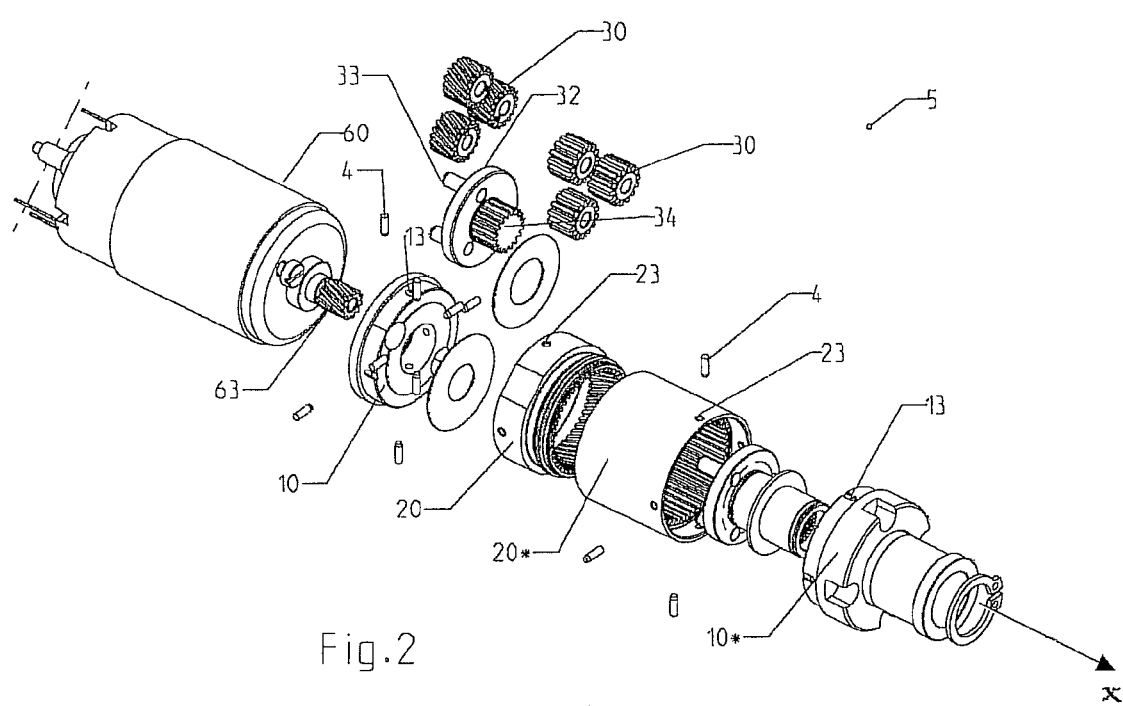
FIG. 2 is an exploded view of a motor and the components of the planet gear.

As is apparent from FIGS. 1 and 2, a planet gear 5 is attached to a motor 60. The motor 60 here presents, in the axial direction x, a motor shaft 62 that is led out of the motor, with a motor pinion 63 attached to it. The axial direction x thus forms simultaneously a rotation axis of the arrangement. For the attachment and the securing of the planet gear, the motor shaft 62 on the motor housing of the motor 60 is enclosed by a motor flange 61.

The planet gear 5 preferably presents in each case, as component groups, on the gear side and the output side, a flange 10, 10*. The flanges 10, 10* form a part of a multipart gear housing. Additional components of the gear housing are formed by at least one ring gear 20 or a multitude of ring gears 20, 20* arranged axially one after the other. The ring gears 20, 20* and flanges 10, 10* are here connected in the axial direction x in such a way that they form a solid gear housing.

In the interior of the gear housing formed by the ring gears 20, 20*, a plurality of planetary wheel carriers 32 is arranged, where said carriers are arranged rotatably in the radial direction r about the rotation axis. The planetary wheel carrier 32 presents with axis parallel to the central rotation axis, planetary wheel shafts 33, on each of which a planetary wheel 30 is attached. By means of its planetary wheel toothed rings 31 (FIG. 3), the planetary wheels 30 of the planetary wheel carrier 32 facing the motor 60 engage in the toothed ring of the motor pinion 63. A rotation of the motor pinion 63 thus produces a rotation of the planetary wheels 30 in the opposite direction. On the side facing the planetary wheels 30, the planetary wheel carrier 32 presents a rotationally fixed sun gear 34 which is connected to the carrier, and whose rotation axis extends along the rotation axis of the motor pinion 63. The planetary wheels 30 of an additional planetary wheel carrier arranged on the output side engage in the toothed ring of the sun gear 34. The sun gear of the last planetary wheel carrier can also be formed as an output shaft.

The ring gears 20, 20* present on the interior side a ring gear toothed ring 21 (FIG. 3), into which the planetary wheels 30 engage with their planetary wheel toothed rings 31. A rotation of the motor pinion 63 thus produces a rotation of the planetary wheels 30 in the opposite direction, and as a result of their engagement in the ring gear toothed ring 21, a rotation of the planetary wheel carrier 32 and of its sun gear 34 in the same direction as the rotation direction of the motor pinion 63.

Figure 3:
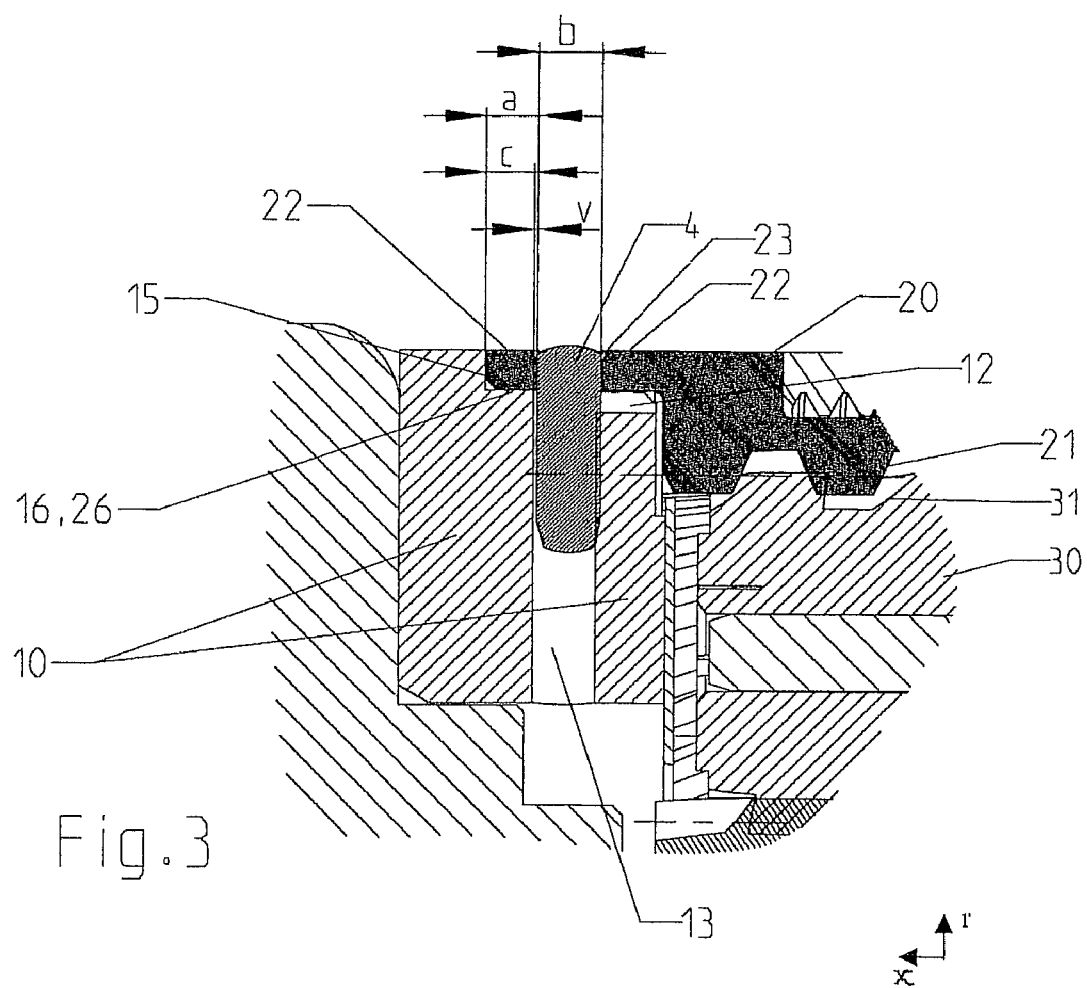
FIG. 3 is an enlarged representation of a transitional area between a flange and a ring gear of the design according to FIG. 1.

As one can seen in FIGS. 1 and 2, and preferably also in FIG. 3, the motor-side ring gear 20 presents an axial ring gear projection 22 which extends on the exterior, i.e., at a separation from the rotation axis, with its axis parallel to the rotation axes, and which grips partially over or around the corresponding adjacent flange 10. In the case of the output-side ring gear 20*, a corresponding ring gear projection protrudes accordingly into the output-side direction, to grip at least partially over or around the output-side flange 10*.

According to the preferred embodiment, the flanges 10, 10* present, in the direction of the ring gear 20, 20* adjacent to it, an axial flange projection 12, which alternatively can also be referred to as a narrowing of the periphery. As a result, a gear housing that closes off in a flush manner is produced, in spite of the fact that the ring gear projection 22 engages in the axis-parallel direction over a portion of the flange 10.

For the solid connection of the ring gear 20, 20* with the flange 10, 10* adjacent to it, ring gear bores 23 which pass continuously through the axial ring gear projection 12, and flange bores 13 which extend at least into the flange or its flange projection 12, are connected in each case with a pin 4 that is introduced into them. The ring gear or flange bores 13, 23 extend preferably in the radial direction r. The pin(s) 4 is (are) preferably dimensioned relative to the bore diameter of the ring gear or flange bores 13, 23 in such a way that they are inserted by press fit, and have a secure hold. Alternatively and equivalently to the above way, it is also possible to use, instead of a pin 4, a screw connection with insertion of a screw.

As can be seen particularly in FIG. 3, the radial flange bore 13 which leads at least into the flange 10 or the flange projection 12, and the radial hollow bore 23 which is led through the ring gear projection 22, are arranged with slight mutual offset. This has the effect of a particularly good hold or a particularly good bracing of the flange 10 and of the ring gear 20 with against each other, when the pin 4 is led through the ring gear bore 23 and the flange bore 13.

It is particularly advantageous to arrange a reference surface 16 on the flange projection 12, which is located opposite a reference surface 26 on the ring gear projection 22, and allows application by the surface of the two reference surfaces 16, 26 to each other. The two reference surfaces 16, 26 present particularly advantageously a cylindrical course that is axis-parallel to the rotation axis.

To improve the bracing of the flange projection 12 and of the ring gear projection 22, the flange 10 presents a flange abutment 15 against which an end section—extending in the axial direction—of the ring gear projection 22 is applied. Here, an abutment separation c of the flange abutment 15 with respect to the flange bore 13 is made slightly smaller or shorter by an offset difference v than the ring gear excess a extending over the ring gear bore 23. A flange bore width b, which is preferably dimensioned relative to the pin diameter for the press fit of the pin 4, is thus located, with separation from the flange abutment 15, opposite the flange bore 13, with slight offset by a flange bore offset 14 or the flange difference v, before the pin 4 is introduced.

To attach the flange 10 to the motor 60, it is preferred to use a flange attachment screw, as sketched in FIG. 1.

Figure 4:
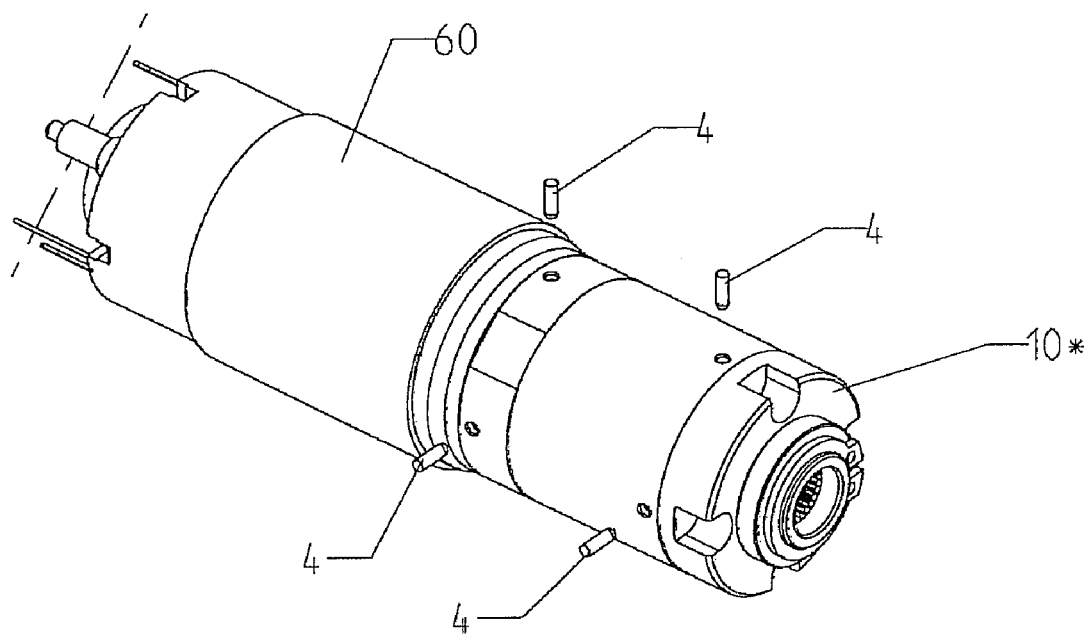
FIG. 4 is a perspective representation of a planet gear attached to a motor.

Turning, then, to FIG. 4, there is shown a perspective view of a planet gear 5 attached on a motor 60 by means of four pins 4. By means of four pins 4, the bearing flange is also fixed radially and axially on the planet gear.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A gear mechanism, said gear mechanism comprising:
   a planet gear, said planet gear further comprising:
   (a) at least one flange configured to adapt said gear mechanism to a drive component, said at least one flange further comprising a corresponding radial flange bore;
   (b) at least one ring gear, said at least one ring gear finely connected on a gear side to said at least one flange, said at least one ring gear further comprising a corresponding radial ring gear bore; and
   (c) a pin, said pin being led through a pair comprising said radial flange bore and said radial ring gear bore, and wherein said at least one flange and said at least one ring gear are braced firmly against each other,
   wherein said radial flange bore and said radial ring gear bore are arranged with at least a partial overlap in an axial direction and simultaneously partially and mutually offset by an offset difference, and wherein said pin is configured such that said pin pressed in by a press fit into said radial flange bore and said radial ring gear bore.

2. A gear mechanism according to claim 1, wherein said at least one flange further comprises:
   a flange projection, said flange projection extending, on the gear side, in an axis-parallel direction, and wherein said corresponding flange bore is led through or into said flange projection.

3. A gear mechanism according to claim 1, wherein said at least one ring gear comprises:
   a corresponding axis-parallel ring gear projection, said corresponding axis-parallel ring gear projection engaging, in said axis-parallel direction, over said at least one flange, and wherein said corresponding ring gear bore leads through said corresponding ring gear projection.

4. A gear mechanism according to claim 2, wherein said at least one ring gear comprises:
   a corresponding axis-parallel ring gear projection, said corresponding axis-parallel ring gear projection engaging, in said axis-parallel direction, over said at least one flange projection, and wherein said corresponding ring gear bore leads through said corresponding ring gear projection.

5. A gear mechanism according to claim 3, wherein:
   (a) said at least one flange comprises a flange abutment which is at a separation from said radial flange bore;
   (b) said ring gear projection is braced against said flange abutment; and
   (c) said flange abutment is at a smaller separation from said radial flange bore than said ring gear bore is from said flange abutment.

6. A gear mechanism according to claim 3, in which said flange projection and said ring gear projection further comprises:
   mutually facing reference surfaces, which are pressed with their surface against each other by said pin.

7. A gear mechanism according to claim 1, said gear mechanism further comprising four or more of said pairs consisting of said radial flange bore and said radial ring gear bore, and wherein a corresponding one of said pin is inserted.

8. A gear mechanism, said gear mechanism comprising:
   a planet gear, said planet gear further comprising:
   (a) at least one flange configured to adapt said gear mechanism to a drive component, said at least one flange further comprising a corresponding radial flange bore;
   (b) at least one ring gear, said at least one ring gear firmly connected on a gear side to said at least one flange, said at least one ring gear further comprising a corresponding radial ring gear bore; and
   (c) a pin;
      (i) said pin being led through a pair, and wherein said pair further comprises said radial flange bore and said radial ring gear bore, and wherein said at least one radial flange bore and said at least one radial ring gear bore are braced firmly against each other and arranged with at least a partial overlap in an axial direction and simultaneously and mutually offset by an offset difference; and
      (ii) said pin being pressed in by a press fit into said radial flange bore and said radial ring gear bore.

9. A gear mechanism according to claim 8, wherein said at least one flange further comprises:
   a flange projection, said flange projection extending, on the gear side, in an axis-parallel direction, and wherein said corresponding flange bore is led through or into said flange projection.

10. A gear mechanism according to claim 9, wherein said at least one ring gear comprises:

a corresponding axis-parallel ring gear projection, said corresponding axis-parallel ring gear projection engaging, in said axis-parallel direction, over said at least one flange projection, and wherein said corresponding ring gear bore leads through said corresponding ring gear projection.

11. A gear mechanism according to claim 8, wherein said at least one ring gear comprises:
a corresponding axis-parallel ring gear projection, said corresponding axis-parallel ring gear projection engaging, in said axis-parallel direction, over said at least one flange, and wherein said corresponding ring gear bore leads through said corresponding ring gear projection.

12. A gear mechanism according to claim 11, wherein:
(a) said at least one flange comprises a flange abutment which is at a separation from said radial flange bore;
(b) said ring gear projection is braced against said flange abutment; and
(c) said flange abutment is at a smaller separation from said radial flange bore than said ring gear bore is from said flange abutment.

13. A gear mechanism according to claim 11, in which said flange projection and said ring gear projection further comprise: mutually facing reference surfaces, which are pressed with their surface against each other by said pin.

14. A gear mechanism, said gear mechanism comprising:
a planet gear, said planet gear further comprising:
(a) at least one flange configured to adapt said gear mechanism to a drive component, said at least one flange further comprising a corresponding radial flange bore;
(b) at least one ring gear, said at least one ring gear firmly connected on a gear side to said at least one flange, said at least one ring gear further comprising a corresponding radial ring gear bore;
(c) a plurality of pins; and
(d) four or more pairs, each of said pairs further comprising said radial flange bore and said radial ring gear bore, and arranged with at least a partial overlap in an axial direction and simultaneously mutually offset by an offset difference, and wherein said at least one flange and said at least one ring gear are braced firmly against each other, and into which a corresponding one of said plurality of pins is inserted.

* * * * *

UNITED STATES PATENT AND TRADEMARK OFFICE
CERTIFICATE OF CORRECTION

| | | |
|---|---|---|
| PATENT NO. | : 8,376,901 B2 | Page 1 of 1 |
| APPLICATION NO. | : 12/707310 | |
| DATED | : February 19, 2013 | |
| INVENTOR(S) | : Riester et al. | |

It is certified that error appears in the above-identified patent and that said Letters Patent is hereby corrected as shown below:

On the Title page, item (75) Inventor's Address "Willingen-Schwenningen (DE)" should be changed to -- Villingen-Schwenningen (DE) --

Signed and Sealed this
Second Day of April, 2013

Teresa Stanek Rea
*Acting Director of the United States Patent and Trademark Office*